United States Patent

[11] 3,545,774

[72] Inventor Samuel S. Rickley
 West Boylston, Massachusetts
[21] Appl. No. 717,679
[22] Filed April 1, 1968
[45] Patented Dec. 8, 1970
[73] Assignee Morgan Construction Company
 Worcester, Massachusetts
 a corporation of Massachusetts

[54] NECK SEAL WITH EXTERNAL REINFORCING BAND BONDED IN POSITION
 4 Claims, 2 Drawing Figs.
[52] U.S. Cl. ................................................ 277/164,
 277/95, 277/235
[51] Int. Cl. ....................................................... F16j 15/32
[50] Field of Search............................................ 277/95,
 164, 179, 235, (ATD)

[56] References Cited
UNITED STATES PATENTS
3,330,567 7/1967 Mercer et al. ............... 277/164
FOREIGN PATENTS
698,710 10/1953 Great Britain................ 277/179

Primary Examiner—Laverne D. Geiger
Assistant Examiner—Jeffrey S. Mednick
Attorney—Chittick, Pfund, Birch, Samuels & Gauthier ABSTRACT: A flexible neck seal, used to prevent entrance of water and scale to the lubrication areas of a rotating element, is reinforced externally by a circumferential steel band to prevent stretching of the seal under operative conditions. The band is affixed permanently to the seal through the use of self-setting resins.

PATENTED DEC 8 1970  3,545,774

INVENTOR.
SAMUEL S. RICKLEY
BY
Russell, Chittick & Pfund
ATTORNEYS 3,545,774

NECK SEAL WITH EXTERNAL REINFORCING BAND BONDED IN POSITION

BACKGROUND OF THE INVENTION

In the field of rolling mills, it has been common practice for many years past to use special types of neck seals which serve the purpose of preventing entry of cooling fluid and scale to the bearing and lubricating areas of the rolls. The neck seals are usually positioned on the tapered portion of the roll necks close to the end of the roll barrels. The neck seal serves to block off the space bounded by the rotating inner bearing sleeve and the stationary seal end plate affixed to the stationary chock.

Over the years, rolling speeds have increased considerably. The higher r.p.m. of the rolls has tended to increase the likelihood of separation of the neck seal from the rolling neck because of the significantly greater centrifugal force. This tendency, of course, has been recognized and steps have been taken to reinforce the neck seal in a manner to prevent separation. One such construction is shown in the patent to Mercer et al., U.S. Pat. No. 3,330,567 issued July 11, 1967 Internally Reinforced Neck Seal.

The present invention constitutes an improvement in that the reinforcing element is not molded into the neck seal when the latter is originally produced. Instead, the neck seal in itself is completely fabricated and thereafter the reinforcing element in the form of a continuous cylindrical band is applied thereto and secured permanently through the use of a self-hardening epoxy resin of such composition that it may withstand without deterioration the highest temperatures to which the neck seal is ever subjected.

By permanently attaching the reinforcing band to the neck seal, the neck seal is thereafter held in a more truly circular condition so that upon application of the seal to the tapered roll neck, it will hold to an exact position of concentricity so that the sealing effect will be uniform about the entire circumference.

In the preferred form of the invention, the reinforcing steel band is preferably made from a strip of stainless steel, the ends of which are abutted and welded. The strip is preferably made as wide as possible within the limits of acceptability by the neck seal configuration thereby to provide maximum resistance to the developing centrifugal force over as much of the axial length of the neck seal as possible. While the cross section of the reinforcing band is preferably flat, it is obvious that other shapes might be used. For example, the band might be corrugated in cross section, or dished slightly to be concave inwardly or outwardly without departing from the basic inventive concept. Another form could be made of wire wound on the seal to fill the available space with the turns lying side by side.

DESCRIPTION OF THE PREFERRED EMBODIMENT

Figure 1:
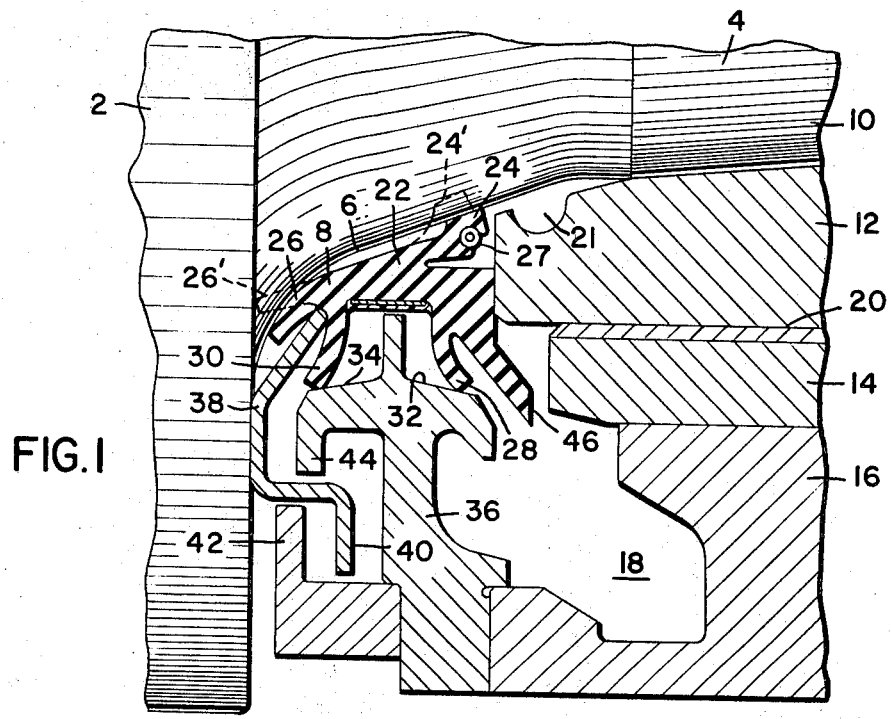
FIG. 1 shows in cross section the neck seal with the reinforcing band thereon in position on the tapered roll neck and abutting against the rotating bearing sleeve and in sliding engagement with the seal end plate that extends circumferentially from the inner end of the roll chock.

Referring to FIG. 1, the neck seal and its reinforcing band are shown in operating position on the roll neck of the roll in a rolling mill.

A portion of the roll is shown at 2. The tapered roll neck 4 extends therefrom. The initial portion of the roll neck is more steeply tapered as at 6 and it is on this portion of that the neck seal indicated at 8 is positioned. The roll neck portion 10 extends away from the roll for an adequate distance to receive thereon the bearing sleeve 12 which along with the neck portion 10 rotates within the fixed bushing 14 which in turn is supported by the roll chock 16.

The neck seal 8 is forced into the position shown in FIG. 1 by engagement with the end of sleeve 12. The neck seal 8 may assume different cross-sectional configurations in accord with the way it is to be related to the sleeve 12 and roll chock 16 for the purpose of sealing off the area 18 in which oil escaping from the bearing surfaces 20 accumulates en route to the force feed oil pump (not shown). The area 21 which may receive some small quantity of lubricant from the engaging exterior and interior surfaces of neck portion 10 and sleeve 12 is also sealed off. The neck seal 8 is customarily molded as an integral circular unit made of reinforced flexible strong rubber-like material which might be likened to the consistency of an automobile tire.

Figure 2:
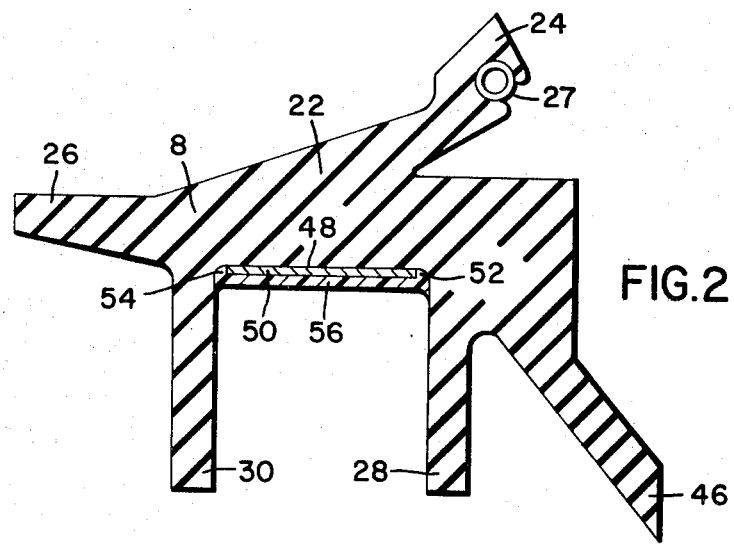
FIG. 2 shows the unmounted neck seal and reinforcing band thereon drawn to an enlarged scale to show in more detail the epoxy resin, or equivalent material, used in maintaining the band in position.

One form of neck seal which is now in common use is shown in the drawings. This seal includes a main body portion 22 having flanges 24 and 26 which, prior to application to the roll neck, may have a configuration as shown in FIG. 2 and as indicated by the dotted lines 24' and 26' in FIG. 1. These flanges are sufficiently flexible so that when the neck seal 8 is forced by sleeve 12 into the position shown on the roll neck in FIG. 1, the flanges 24 and 26 will adapt to the roll neck shape and make tight-sealing engagement therewith. A garter spring 27 may be included in flange 24 to increase the inward pressure.

Additional circumferential flanges 28 and 30 are utilized to make sliding engagement with cooperating internal faces 32 and 34 of the circumferentially extending seal end plate 36. Additional security against the entrance of water to space 18 is provided customarily through the use of a seal inner ring 38 which fixedly engages the end surface of roll 2 and the apex at the juncture of flange 26 and flange 30. The outer end 40 of seal inner ring 38 is located within the confines of a fixed seal outer ring 42 and a fixed flange 44 that extends outwardly from the inner portion of seal end plate 36.

The foregoing description is made for the purpose of establishing the environment of the present invention and to emphasize the importance of providing a neck seal construction which will hold the neck seal in tight immovable position on the tapered roll neck portion 6. By such construction, all parts of the neck seal that are relied upon to prevent the passage of water into the area 18 will maintain constant relationship with each other regardless of the speed of rotation of the roll. It is believed apparent that if the main body portion 22 of neck seal 8 can be positively maintained in fixed position on the tapered roll neck then the sealing flanges 24, 26, 28 and 30 will likewise maintain their positions.

Reference is now made to FIG. 2 showing the neck seal per se prior to its application to the tapered roll neck. In this view, the sliding flanges 24, 26, 28 and 30 and a flinger 46 are shown in their original molded condition prior to being flexed by application to operative position. The body 22 of the neck seal is formed with a flat circular area 48 which extends for the full axial length between flanges 28 and 30. Positioned firmly on the circular cylindrical area 48 is a steel band 50. This is preferably made from a strip of stainless steel with its abutting ends welded together. In the disclosed construction, the band made of hard and springy steel may be in the order of one thirty-seconds inch thick and 1 inch wide. The band is formed prior to its application to the neck seal. The band is applied by forcibly buckling the neck seal sufficiently so that it may be placed within the confines of the band and then allowed to expand to normal position. The dimensions are accurately controlled so that when the neck seal is in position within the band there will be smooth, continuous tight engagement between the band and neck seal surfaces without any trace of residual buckling in the neck seal.

Preferably, there will be a small clearance between the edges of the band and the inner edges of the walls of flanges 28 and 30 as indicated at the locations 52 and 54. With the band established in this position on the neck seal, the epoxy resin is applied thereto in the following manner. The neck seal is mounted for rotation about its axis with the axis in true horizontal position. Thus, when the neck seal with the band thereon is rotated, rotation will be in a vertical plane. Rotation is established at about 2 to 3 r.p.m. and heat lamps are directed to the band to bring the band surface temperature to approximately 100° F. With the band at this temperature and rotating at a slow speed, the epoxy resin in the form of a viscous fluid is poured slowly on the top of the band. The resin is sufficiently tenacious so that it does not drip off at the bottom point of band rotation. Instead, because of the strong cohesive effect, it continuously spreads itself laterally and evenly over the band throughout the rotation. As soon as enough resin has been applied to provide for a covering of resin over the entire band to a depth of approximately three thirty-seconds inch, the supply is discontinued. The resin, of course, fills up the corner areas 52 and 54 and due to the surface tension spreads itself uniformly over the entire band surface. Rotation of the band is continued at the same slow speed of 2 to 3 r.p.m. At the end of approximately each half hour, the direction of rotation of the neck seal is reversed until the hardening of the resin is well established. Rotation is continued until solidification of the resin is complete.

An example of a suitable resin for accomplishing the above result is as follows. That sold under the Trademark DEVCON, known as DEVCONFLEX, constituting 47.6 percent by weight mixed with DEVCON putty type A constituting 52.4 percent by weight has been found suitable to achieve a satisfactory result.

Once the steel band has been applied to the neck seal in the foregoing manner, the unit is then ready for application to the tapered roll neck of the roll of a rolling mill. When so applied, it has been found that the sealing capability of the neck seal according to whatever design of flanges may be used reaches maximum capacity. The construction is relatively inexpensive and simple of accomplishment and is to be preferred over those constructions in which the reinforcing elements are molded within the body of the neck seal. It should further be pointed out that the moment of inertia for all cross sections throughout the circumference of the neck seal and band is uniform so that no unbalanced forces are generated during high-speed rotation.

As an alternative to the foregoing method of securing the band in position on the neck seal, it might be considered desirable for extra security to place a thin layer of the epoxy resin on the surface 48 of the neck seal prior to positioning the band thereon. In practice, this has not been found necessary, but it is mentioned as a modification to be considered within the scope of the invention.

While the preferred form of reinforcing band is that herein disclosed, it is to be understood that other types of bands which could be considered the equivalent thereof might be used. For example, a plurality of individual wire bands which could be laid side by side across the circular surface 48 might be used, or the wire might be wound on with the turns abutting. The principle of the invention, however, is not so much in the particular type of reinforcing band used, but in the positive securing of the band in position over a relatively broad surface of sufficient dimension to give good stability to all parts of the neck seal which are caused to be flexed when the neck seal is placed in operative position on the roll neck.

It is intended to cover all changes and modifications of the example of the invention herein chosen for purposes of the disclosure which do not constitute departures from the spirit and scope of the invention.

I claim:

1. A neck seal for use on the tapered neck of a rolling mill roll, said seal comprising a circular flexible body of frustoconical interior surface configuration to conform generally to said tapered roll neck and a cylindrical exterior surface configuration, a plurality of flexible flanges extending away from said body which, upon application of said seal to said neck, will be flexed appreciably by engagement with cooperating elements with which fluid sealing engagement is to be made, two of said flanges extending radially outward from said body to provide the axial limits of said cylindrical surface, a metallic cylindrical band snugly engaging said cylindrical surface and extending axially for a majority of the distance between said two radially extending flanges, said band permanently affixed to said seal by a self-hardening resin originally flowed into position about the entire circumference of said band and subsequently hardened to cover said band and to engage the opposed walls of said two flanges.

2. A neck seal as set forth in claim 1, said band being made of a flat strip of stainless steel having a width only slightly less than the space between said opposed flanges.

3. A neck seal as set forth in claim 1, said self-hardening resin also being present between said band and the said cylindrical surface.

4. A neck seal as set forth in claim 1, said flanges also including two other flanges extending away from the opposite ends of said body beyond the axial limits of said band, said two other flanges adapted to engage said roll neck.